United States Patent [19]

Sato

[11] 4,401,995
[45] Aug. 30, 1983

[54] CHART RECORDER RECORDING METHOD AND APPARATUS

[75] Inventor: Hiroshi Sato, Fujisawa, Japan

[73] Assignee: Daiichi Electric Co., Ltd., Kanagawa, Japan

[21] Appl. No.: 221,410

[22] Filed: Dec. 30, 1980

[30] Foreign Application Priority Data

Jan. 25, 1980 [JP] Japan ................................. 55-006768

[51] Int. Cl.³ ............................................... G01D 9/00
[52] U.S. Cl. ............................................... 346/110 R
[58] Field of Search .................... 346/110 R, 1.1, 161, 346/110 V; 315/391–395, 379; 340/724, 728

[56] References Cited

U.S. PATENT DOCUMENTS 3,605,109  9/1971  Tyler et al. ................. 346/110 R X
3,700,955 10/1972  Lowe .......................... 346/110 R X Primary Examiner—C. D. Miller
Assistant Examiner—W. J. Brady
Attorney, Agent, or Firm—Wenderoth, Lind & Ponack

[57] ABSTRACT

In a chart recorder using a fiber optics tube, a method and apparatus for recording signals on a record medium such as a photo sensitive paper by simultaneously scanning a beam in the fiber optics tube both horizontally and vertically.

5 Claims, 12 Drawing Figures

FIG. 2
PRIOR ART
FIG. 3
PRIOR ART
FIG. 4
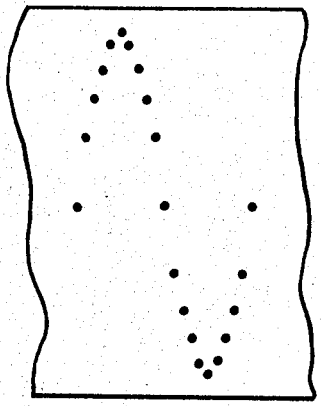
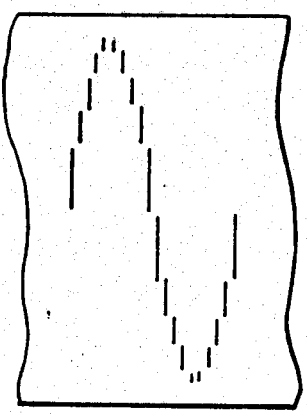
FIG. 5
FIG. 6
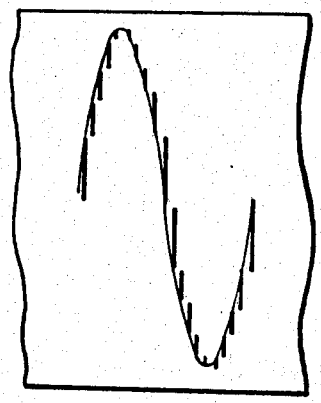
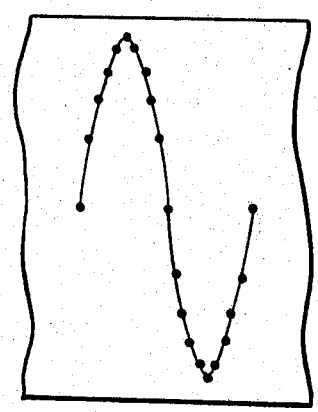
PRIOR ART

CHART RECORDER RECORDING METHOD AND APPARATUS

BACKGROUND OF THE INVENTION

1. Field of the Invention

The present invention relates to a method and apparatus for recording signals with a chart recorder and a device; more particularly, the present invention relates to a method and apparatus for recording signals with a chart recorder, and a fiber optics tube producing an electron beam which is simultaneously deflected both horizontally and vertically.

2. Description of the Prior Art

Devices and methods of this type are fairly well known. For example, U.S. patent application Ser. No. 1427/70 now U.S. Pat. No. 3,605,109 filed Jan. 8, 1970 is noted. The method and the device disclosed therein teaches a method and apparatus for recording signals on a record medium such as a photo sensitive paper by a fiber optics tube which sweeps only horizontally.

As mentioned above, a conventional chart recorder using a fiber optics tube records signals as dots or lines while scanning lines which are horizontally parallel to each other. Consequently, the dots or the lines do not connect to each other.

Whereas, the chart recorder recording method and device of the present invention employs a horizontal sweeping means and a vertical scanning means using a horizontal deflection yoke and a vertical deflection yoke on the fiber optics tube, the fiber optics tube has the vertical deflection yoke, too, in order to adjust for the vertical drift of the electron beam in the tube caused by the environmental magnetic fields, geomagnetism, heat drift of electrodes and/or the like.

A conventional chart recorder with a fiber optics tube uses the vertical deflection yoke only for adjusting for vertical drift. Whereas, the present invention uses the vertical deflection yoke for not only for adjusting for vertical drift but also for scanning signals vertically. The signals can thereby be recorded not "in one field" but "in two fields".

Hence, in this invention, a signal in one sampling or scanning can be recorded on a photo sensitive paper as a line which has not only length but also inclination; thus, one line in one scanning connects to the next line in the next scanning. Consequently, one connected line being bent at each connection can be obtained, which is very similar to the original signal wave.

Referring to FIG. 1, there is illustrated a fiber optics tube with a record medium such as a photo sensitive paper. A conventional chart recorder scans an electron beam only in the horizontal direction marked by line A-A' in FIG. 1, and the photo sensitive paper is intermittently driven vertically in the direction marked by arrow B in FIG. 1. Therefore, a wave illustrated in FIG. 2 as an example is recorded on the photo sensitive paper by the dots shown in FIG. 3. This wave in FIG. 2 is a sine wave, which is very simple to record. However, it is very difficult or impossible to determine the shape of a wave or waves on the paper in the case of a complicated wave or multiple waves. This is because it is very difficult or impossible to find which dot follows another dot.

In order to solve this problem, another chart recorder was invented, which is disclosed in the U.S. patent application Ser. No. 1427/70 now U.S. Pat. No. 3,605,109 as mentioned above, and a wave of which is recorded as lines on the paper as illustrated in FIG. 4. However, the lines are all horizontal and are not connected each other. Consequently, the recorded wave is not similar to the original wave as the recorded wave by the present invention is, which is illustrated in FIGS. 5 and 6. Since the lines are not connected to each other, it is impossible to figure out the natural shape of the recorded wave or waves even if the gaps between the disconnections are small as can be understood from the chart shown in FIG. 5, wherein the original sine wave in FIG. 2 and the recorded lines in FIG. 4 are illustrated together.

The present invention has changed the basic recording means from one dimension to two dimensions. Thus, the above mentioned problems in prior arts have been solved.

SUMMARY OF THE INVENTION (1) It is an object of the present invention to provide a method for recording a signal wave on a record medium such as a photo sensitive paper by simultaneously scanning an electron beam in a fiber optics tube vertically as well as horizontally.

(2) It is another object of the present invention to provide a chart recorder using a fiber optics tube to record signals on a record medium such as a photo sensitive paper by simultaneously scanning an electron beam in the fiber optics tube vertically as well as horizontally.

(3) Another object of the present invention is to provide a chart recorder using a fiber optics tube to record a signal wave on a record medium, one line of which in one scanning connects to the next line in next scanning so that all the lines are connected one after another.

(4) A further object of the present invention is to provide a chart recorder using a fiber optics tube to record a signal wave so as to obtain a recorded wave which is very similar to the original wave.

(5) Furthermore, it is another object of the present invention to provide a chart recorder using a fiber optics tube to record a complicated wave having a higher degree of fidelity and closely resemblings the original wave.

(6) Still further, it is another object of the present invention to provide a chart recorder using a fiber optics tube to record multisignal waves having a higher degree of fidelity and more closely resembleing original waves.

(7) Another object of the present invention is to provide a chart recorder which has a brightness adjustment circuit for adjusting the brightness of each signal for a line on the screen of the fiber optics tube at each scanning.

(8) It is a further object of the present invention to provide a multichannel chart recorder which has a time delay circuit for adjusting for time delay between each channel to compensate for the record medium being driven continuously.

(9) It is still a further object of the present invention to provide a chart recorder which has a laser (heat or light) recording means and a record medium therefor instead of an ordinary fiber optics tube and record medium therefor.

(10) The various features of novelty which characterize the present invention are pointed out with particularity in the claims annexed to and forming a part of this specification. For a better understanding of the invention, its operating advantage, and specific objects attained by its use, reference should be had to the accompanying drawings and descriptive matter in which there is illustrated and described a preferred embodiment of the invention. It should be understood that any change within the scope of the claims may be resorted without departing from the spirit of the invention or sacrificing any of the advantages thereof.

BRIEF DESCRIPTION OF THE DRAWINGS

FIG. 2 is one example of signal waves which can be recorded by the device and the method of the present invention.

FIG. 3 is a chart of dots recorded by a conventional device and a method representing the signal wave shown in FIG. 2.

FIG. 4 is a chart of lines recorded by another conventional device and method representing the signal wave shown in FIG. 2.

FIG. 5 is a chart showing the signal wave shown in FIG. 2 and the lines shown in FIG. 4, which shows some discrepancies.

FIG. 6 is a chart showing lines connected each other recorded by the device and the method of the present invention.

DETAIL DESCRIPTION OF THE PREFERRED EMBODIMENT

Figure 1:
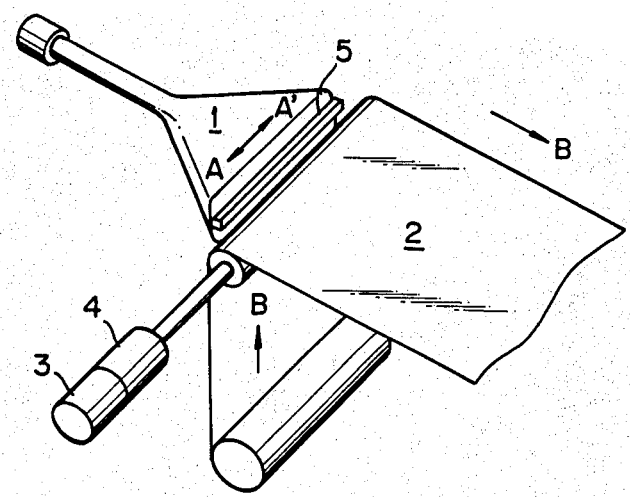
FIG. 1 is a perspective view of a fiber optics tube and a record medium with a driving means of a chart recorder.
Figure 7:
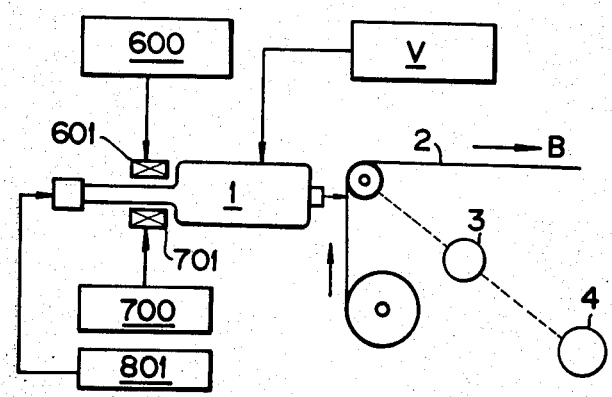
FIG. 7 is a block diagram of a chart recorder of the present invention.

Referring now to FIGS. 1 and 7 there is illustrated therein a chart recorder which is constructed according to the teachings of the present invention. As shown in FIGS. 1 and 7, a fiber optics tube 1 records a data signal wave on a record medium 2 such as a photo sensitive paper, thermally sensitive paper or the like. The photo sensitive paper 2 is driven by a pulsemotor 4 following an encoder 3 intermittantly in the direction marked by arrow B. When said photo sensitive paper 2 is in a stationary condition, said fiber optics tube 1 records a data signal on the photo sensitive paper 2. An electron beam emitted from the cathode of the fiber optics tube 1 is simultaneously deflected by the horizontal deflection yoke 601. The electron beam almost exactly follows the original signal wave in one sampling (The width of one vertical scanning is very small—smaller than one m/m—in real recording although the chart illustrated in FIG. 5 is shown very roughly in order to explain how to sweep each line). Thus, the swept electron beam impinges on the flourescent screen of the fiber optics tube 1 and displays the same pattern that the electron beam sweeps. Consequently, the pattern is recorded on the photo sensitive paper 2. After it has been recorded thereon, the photo sensitive paper 2 is again driven so as to record the next line in next sampling.

Figure 8:
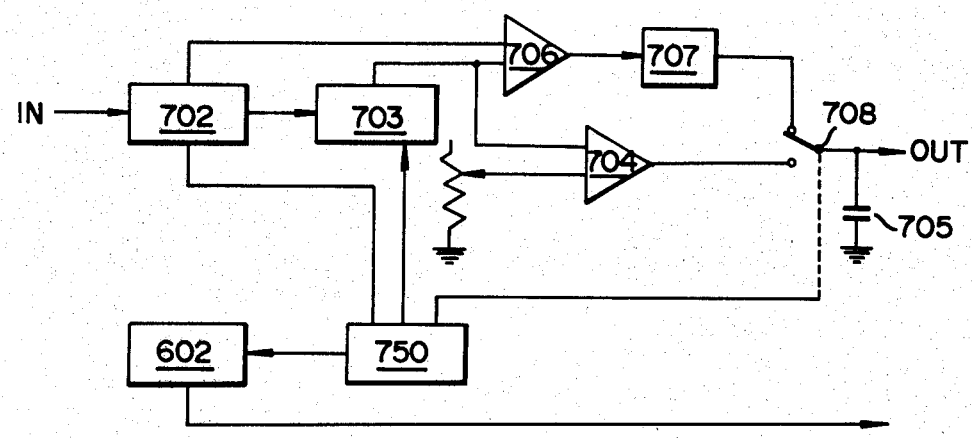
FIG. 8 is a detail block diagram of a part of the control circuit of the chart recorder of the present invention.
Figure 9:
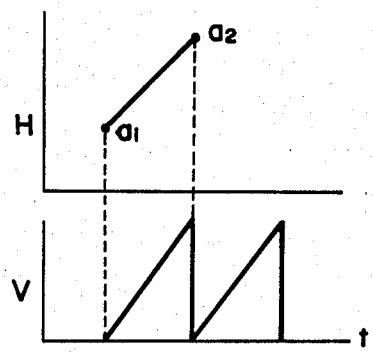
FIG. 9 is a chart showing the horizontal deflection and the vertical deflection from one sampling in a monochannel chart recorder of the present invention.
Figure 10A:
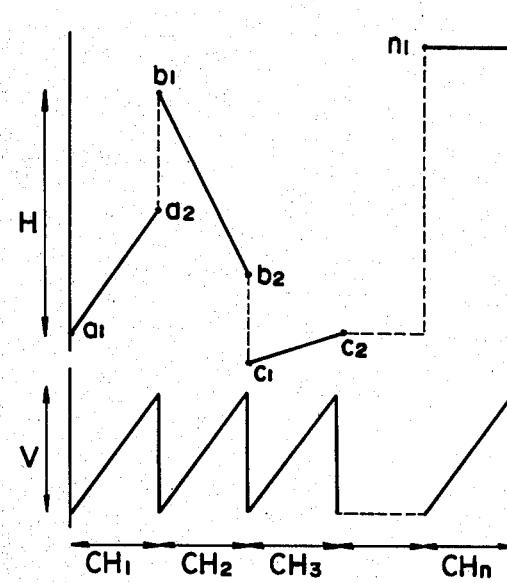
FIG. 10a is a chart of a multichannel chart recorder of the present invention showing horizontal deflections and vertical deflections from each sampling in each channel.

The deflections are controlled by a vertical deflection circuit 600, horizontal deflection circuit 700 and a timing controller 750. The vertical deflection circuit 600 shown in FIG. 7 comprises a saw-tooth wave oscillator 602 as shown in FIG. 8 and a vertical deflection yoke 601. Saw-tooth waves are generated by the saw-tooth wave oscillator 602 as illustrated in FIGS. 9 and 10a. The saw-tooth waves scan the electron beam emitted from the cathode of the fiber optics tube 11 vertically, regularly and continuously through the vertical deflection yoke 601. The length of the vertical scan is the same length as the photo sensitive paper 2 is driven in one scanning. Therefore, a recorded line can connect to the next recorded line.

FIG. 8 illustrates the horizontal deflection circuit 700, which comprises a primary sample hold circuit 702, a second sample hold circuit 703, an adder 704, a capacitor 705, a differential amplifier 706, a V/I convertor 707 and a switch circuit 708.

A data signal at the first sampling is fed into the primary sample hold circuit 702, and is transferred to the secondary sample hold circuit 703 at the time of the second sampling. The data signal at the first sampling is again transferred from the secondary sample hold circuit 703 to the adder 704, the output of which charges the capacitor 705 through the first terminal of the switch circuit 708. Consequently, the capacitor stores the signal sample as a charge (a1) as shown in FIG. 9 and acts as an integrator for consecutive charges representing each sampling. For example, each sampling, depending on its voltage charge ($\Delta V$), would represent a quantitive $\Delta Q$ which would accumulate on said capacitor in a positive or negative direction. This would represent the signal being sampled going either in a positive or negative direction.

The data signal at the first sampling is also fed into the first input of the differential amplifier 706, and the data signal from the second sampling is fed from the primary sample hold circuit 702 to the secondary input of the differential amplifier 706, the output of which is the potential difference between the data signals at the first sampling and the second sampling. The potential defference is then fed into the V/I converter 707, wherein the potential difference is converted from a voltage to a regulated current. Thus, the current charges the capacitor 705 in a positive or negative direction through the second terminal of the switch circuit 708. The regulated current decides an angle of inclination a1-a2, as shown in FIG. 9 and point a1 is positioned when the potential of the saw-tooth wave V for vertical deflection is at its lowest. Similarly, a2 is positioned when the potential of the saw-tooth wave V is at its highest as shown FIGS. 6 and 9 (The dots on the wave shown in FIG. 6 would not appear on a real wave measured by this invention. They are added for the sake of explanation). Furthermore, during one vertical scanning or one sampling, the electron beam horizontally sweeps a distance directly proportional to the change in value of the original data signal wave being sampled during one vertical scanning. After having finished recording the swept beam, the photo sensitive paper 2 is driven by the pulsemotor 4 in the direction marked by arrow B the paper 2 being driven the same length as the vertical deflection sweeps.

Referring to FIG. 8, there is illustrated the timing controller 750, which controls the timing of the primary sample hold circuit 702, the secondary sample hold circuit 703, the switch circuit 708 and the saw-tooth wave oscillator 602.

Figure 10B:
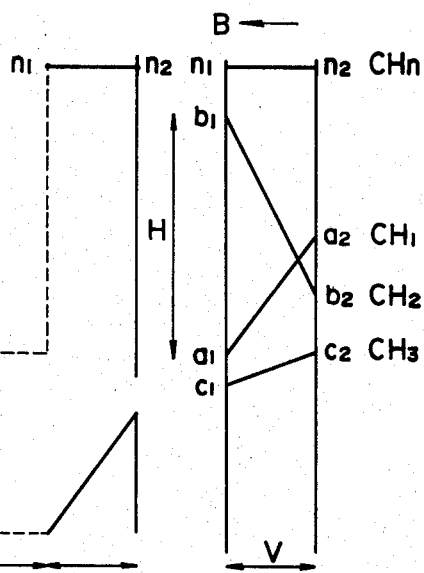
FIG. 10b is a chart of the multichannel chart recorder showing a recorded chart on a recorded medium obtained from one sampling.
Figure 11:
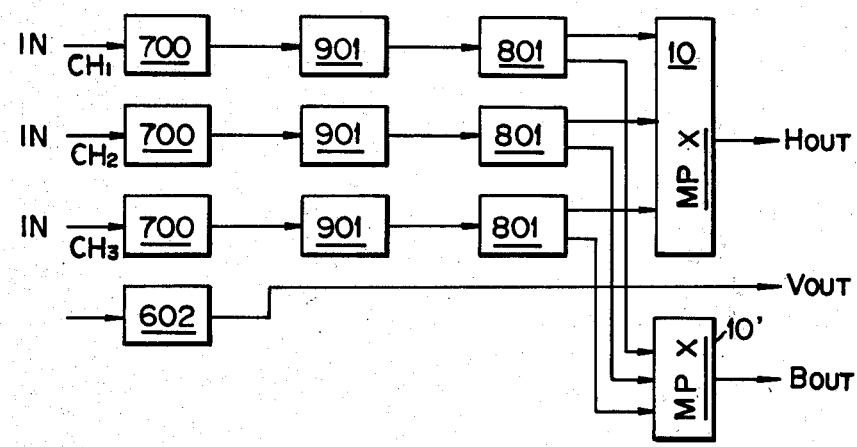
FIG. 11 is a block diagram of a brightness compensation circuit and a time delay compensation circuit of a chart recorder of the present invention.

Referring now to FIGS. 10a, 10b, and 11, there is illustrated another embodiment of a multichannel chart recorder according to the present invention.

A chart recorder generally simultaneously records not only one data signal wave but many kinds of data signal waves on a recording medium during one recording. Therefore, this embodiment employs a multiplexer 10 as illustrated in FIG. 11, wherein a plurality of the horizontal deflection circuits 700 are used, and the output of which are respectively fed into the multiplexer 10. The signals of each output of each horizontal deflection circuit 700 are fed into the horizontal deflection yoke 701 in turn during one stop driving condition of the paper 2. When the first horizontal signal a1-a2 in channel 1 (CH1) is fed into the horizontal deflection yoke 701, the first vertical sweep is accomplished. Then, the second vertical sweep is accomplished when the second horizontal signal b1-b2 from channel 2 (CH2) is fed into the horizontal yoke 701, and so on for n-signal n1-n2 in channel n (CHn) as shown in FIGS. 10a and 10b.

An embodiment of the above mentioned multichannel chart recorder of the present invention is illustrated in FIG. 11. The photo sensitive paper 2 of the previous mentioned multichannel chart recorder is driven intermittently, whereas the photo sensitive paper 2 in this embodiment is driven continuously. Consequently, each data recorder on the photo sensitive paper 2 has a time delay factor, which may be compensated for while recording. Therefore, this embodiment employs a time delay circuit 901 so as to adjust for the time difference caused by the paper 2 being continuously driven.

As described above, the length of the horizontal sweep is not always the same, although the length of the vertical sweep is always the same. Therefore, the brightness of the wave recorded on the photo sensitive paper 2 is partially different. This is because the electron beam in the fiber optics tube 1 is weaker for longer recorded segments than shorter segments. This embodiment, therefore, employs a brightness adjustment circuit 801.

Consequently, a signal from the horizontal deflection circuit 700 is amplified more by the brightness adjustment circuit 801 when a horizontal sweep is longer. In case of a multichannel chart recorder of the present invention, brightness multiplexer 10' is employed, the input of which connects to the output of the horizontal deflection circuits 700 respectively and the output of which connects to the fiber optics tube 1. Each adjusted output for controlling the brightness is thereby fed in turn into the fiber optics tube 1.

The vertical deflection is the same amplitude of a sawtooth wave even for the multichannel chart recorder of the present invention, and it does not require much power to scan the electron beam since the vertically sweep is only a few millimeters at most, and is generally one millimeter or less.

In the above mentioned embodiments, the vertical sweeps are always the same length, and the horizontal sweeps are not always the same length. However, it is possible to alternate them such that the vertical sweeps depend on data signals, and the horizontal sweeps are the same level as the saw-tooth waves. Of course, in this case, the driving length of the record medium 2 depends on the vertical signal.

It is also possible to alternate them so that both of the vertical sweeps and the horizontal sweeps depend on data signals, since the basic concept of this invention is sweeping in a "two dimension" field in a chart recorder.

Another alternative is to employ a laser record means (heat wave or light wave), a sweep means therefor and a record medium such as a thermally sensitive paper, photo sensitive paper and the like instead of the ordinary fiber optics tube 1, the deflection yokes 601 and 701 and the record medium 2.

We claim:

1. A chart recorder using a fiber optics tube, said recorder comprising:
   a vertical deflection circuit;
   a vertical deflection yoke whose input is connected to an output of said vertical deflection circuit and which is attached to said fiber optics tube, said vertical deflection circuit including a saw-tooth oscillator;
   a horizontal deflection circuit;
   a horizontal deflection yoke whose input is connected to the output of said horizontal deflection circuit and which is attached to said fiber optics tube; and
   a timing controller which controls the timing of said vertical deflection circuit and said horizontal deflection circuit;
   wherein said horizontal deflection circuit comprises:
   a primary sample hold circuit, data signals obtained from a sampling being fed into an input of said primary sample hold circuit;
   a secondary sample hold circuit whose input is connected to a first output of said primary sample hold circuit;
   an adder whose input is connected to an output of said secondary sample hold circuit;
   a differential amplifier whose first input is connected to said output of said secondary sample hold circuit and whose second input is connected to a second output of said primary sample hold circuit;
   a V/I converter whose input is connected to an output of said differential amplifier;
   a switch circuit whose first terminal is connected to an output of said adder and whose second terminal is connected to an output of said V/I converter; and
   a capacitor which is charged by signals from said switch circuit.

2. The chart recorder using a fiber optics tube according to claim 1, wherein said horizontal deflection circuit further comprises a brightness adjustment.

3. A chart recorder using a fiber optics tube, said recorder comprising:
   a vertical deflection circuit;
   a vertical deflection yoke whose input is connected to the output of said vertical deflection circuit and which is attached to said fiber optics tube, said vertical deflection circuit including a saw-tooth oscillator;
   a horizontal deflection yoke which is attached to said fiber optics tube;
   a plurality of horizontal deflection circuits and a multiplexer whose inputs are respectively connected to outputs of said horizontal deflection circuits and whose output is connected to an input of said horizontal deflection yoke;

and a timing controller which controls the timing of said vertical deflection circuit and said horizontal deflection circuits.

4. The chart recorder using a fiber optics tube according to claim 3, wherein said horizontal deflection circuits further comprise respective brightness adjustment circuits and wherein said recorder further comprises a brightness multiplexer whose inputs connect to respective outputs of said brightness adjustment circuits and whose output is connected to said fiber optics tube.

5. The chart recorder using a fiber optics tube according to claims 3 or 4, wherein said horizontal deflection circuits further comprise respective time delay circuits.

* * * * *